United States Patent [19]

Dworak et al.

[11] 4,331,048
[45] May 25, 1982

[54] CUTTING TIP FOR METAL-REMOVING PROCESSING

[75] Inventors: Ulf Dworak, Baltmannsweiler; Hans Olapinski, Aichwald, both of Fed. Rep. of Germany

[73] Assignee: Feldmühle Aktiengesellschaft, Fed. Rep. of Germany

[21] Appl. No.: 154,608

[22] Filed: May 30, 1980

[30] Foreign Application Priority Data

Jun. 8, 1979 [DE] Fed. Rep. of Germany ....... 2923213

[51] Int. Cl.³ .................. B23B 3/00; B26D 1/00; C04B 35/48
[52] U.S. Cl. .................. 82/1 C; 407/119; 501/105
[58] Field of Search .................. 407/119; 82/1 C; 106/57

[56] References Cited

U.S. PATENT DOCUMENTS

| | | | |
|---|---|---|---|
| 3,247,000 | 4/1966 | Taylor | 106/57 |
| 4,073,845 | 2/1978 | Buljan et al. | 106/57 X |
| 4,155,124 | 5/1979 | Kawahara et al. | 106/57 X |
| 4,218,253 | 8/1980 | Dworak et al. | 106/57 X |
| 4,221,650 | 9/1980 | Friese et al. | 106/57 X |

OTHER PUBLICATIONS

Claussen, N., "Fracture Toughness of $Al_2O_3$ with an Unstabilized $ZrO_2$ Dispersed Phase", J. Am. Cer. SOC., Jan.-Feb. 1976, pp. 49-51.

*Primary Examiner*—Harrison L. Hinson
*Attorney, Agent, or Firm*—Toren, McGeady and Stanger

[57] ABSTRACT

A sintered cutting tip composed of
70-90 weight percent of aluminum oxide;
10-30 weight percent of zirconium oxide;
0.1-0.5 weight percent of magnesium oxide,
and less than 0.6 weight percent of impurities, having a porosity of less than 2%,
an average particle size of less than 1.7 µm, and a fracture toughness $K_{Ic}$ at room temperature of at least 190 $N/mm^{3/2}$ and of at least 140 $N/mm^{3/2}$ at 1000° C.

A method for manufacturing the cutting tip and its use are disclosed. Cutting tips in accordance with the present invention possess superior performance in terms of longer cutting life and are particularly suitable for use with case-hardened, quenched and tempered steels at high cutting speeds.

17 Claims, 1 Drawing Figure

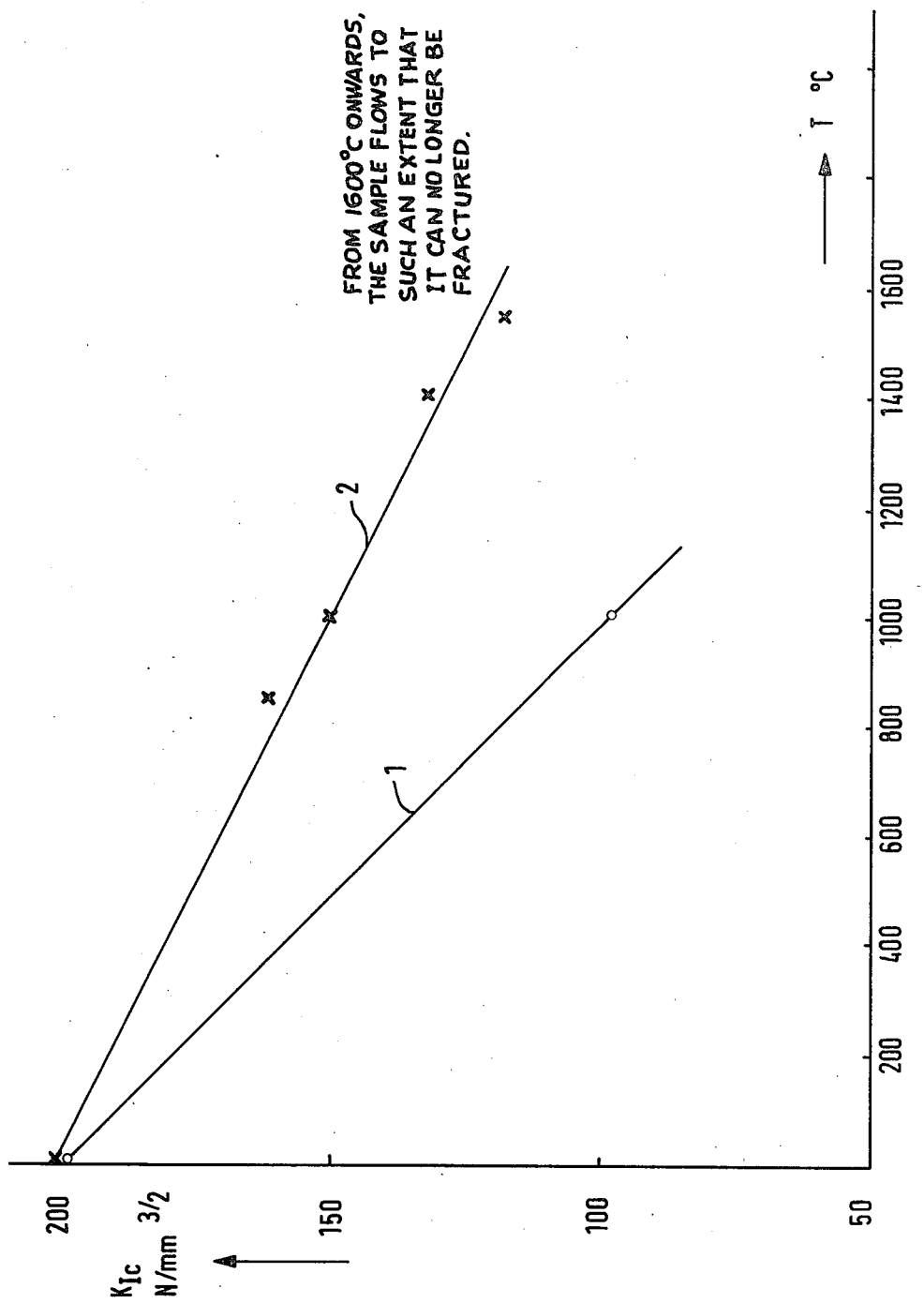

CUTTING TIP FOR METAL-REMOVING PROCESSING

BACKGROUND OF THE INVENTION

1. Field of the Invention

The invention relates to a cutting tip for removal of metal during the processing of metal parts, such as, shafts, axles, etc. Particularly, it pertains to cutting tips for case-hardened and quenched and tempered steel, preferably for use at cutting speeds greater than 500 m/min, consisting of aluminum oxide with additions of zirconium oxide and sintered at a high temperature.

2. Description of the Prior Art

In recent decades, cutting tips based on aluminum oxide have proven themselves in an outstanding manner for the machining of metals. Thus, of the cutting materials available, these cutting tips have found steadily increasing use especially for machining operations at high cutting speeds which result in high temperatures. Aluminum oxide possesses a certain brittleness which decreases the life of the cutting edges of the cutting tips. Thus, such tips are not entirely satisfactory and in spite of the great hardness and wear resistance of the aluminum oxide cutting tips, efforts are still being made to further improve this material.

Quite a number of proposals have therefore already been made for making the aluminum oxide based, relatively brittle cutting tips more ductile by means of additives, i.e., in order to increase their ultimate breaking strength. Such additives may consist of metals which lead to the so-called "cermets". Additions of metal carbides, nitrides and borides, such as, for example, titanium carbide, which particularly increase the wear resistance, have proven to be valuable.

An older proposal disclosed in German Auslegeschrift No. 23 07 654 suggests using zirconium oxide as a material for cutting tips. This zirconium oxide is partially stabilized and has a cubic phase content of 75–95%. In German Offenlegungsschrift No. 27 41 295, this suggestion is taken up once again with the variation that 0.5 to 35 weight percent of the partially stabilized zirconium oxide is intercalated in a matrix of α-aluminum oxide. This provides an increase in the shape-stability of the cutting tips. Due to the relatively high stabilizer content, i.e., 4 weight percent of calcium oxide, the heat resistance of these cutting tips is decreased to such an extent that their performance at high cutting speeds is less than even that of a pure aluminum oxide ceramic.

The problems associated with these aluminum oxide cutting ceramics containing additives generally arise from the fact that the desired effect, for example, the prevention of brittleness, is too small if the amount of additive is insufficient and that the heat stability at the temperatures encountered at high cutting speeds is reduced as the amount of additive is increased.

SUMMARY OF THE INVENTION

We have discovered a cutting tip having clearly improved performance. In particular, the cutting tip of the present invention exhibits a longer cutting life and a greater output per cutting tip and per unit time. The need for such cutting tips arises particularly in the processing of steel parts and especially those which are to be processed from case-hardening steel and quenched and tempered steel, such as, shafts, axles, etc.

More particularly, the cutting tip of the present invention is composed of aluminum oxide with additions of zirconium oxide which is sintered at high temperatures, wherein:

(a) the material composition is

70–90 weight percent of aluminum oxide,

10–30 weight percent of zirconium oxide, 0.1–0.5 weight percent of magnesium oxide with the other oxide impurities amounting to less than 0.6% by weight, the proportions of components adding up to 100;

(b) the porosity is less than 2%;

(c) the average particle size is less than 1.7 μm; and (d) the fracture toughness $K_{Ic}$ at room temperature is at least 190 N/mm$^{3/2}$ and at least 140 N/mm$^{3/2}$ at 1000° C., measured on prismatic rods cut 2.5 mm wide, 3.5 mm high and 12 mm long from the cutting tips and provided with a saw cut 120 μm wide, 0.8±0.1 mm deep and having a notch radius of between 50 and 60 μm.

In accordance with another aspect of the present invention, the cutting tips of the present invention are prepared by intimately mixing the above-mentioned components in the amounts indicated with the addition of molding auxiliaries and, molding and sintering the mixture in the desired geometric shape at a temperature in the range from about 1500 to 1600° C. for a period of at least about 3 hours.

BRIEF DESCRIPTION OF THE DRAWING

The drawing is a graph of the variation of fracture toughness with temperature for certain ceramic materials.

DESCRIPTION OF THE PREFERRED EMBODIMENT

German Offenlegungsschrift No. 25 49 652 discloses the use of sintered objects with a matrix of widely differing materials, including aluminum oxide and intercalated particles of unstabilized zirconium oxide for gas turbine components which require a high resistance to temperature changes. It was completely surprising, however, that, by the interaction of all the above-mentioned characteristics, cutting tip properties are achieved which make it possible to attain performances significantly higher than those attained by any previously known cutting tips and particularly at high cutting speeds, i.e., 500 m/min and higher. This was particularly surprising because the stresses present in cutting tips are of a type completely different from those in gas turbines, for example, and because cutting tips are subject to high wear, edge stresses and interactions with the materials being machined, which generally are negatively affected by appreciable additions of ductilizing materials. It is difficult to establish which of these characteristics is of greater importance.

It is, however, of considerable significance that the individual components are present in a very pure form and that the magnesium oxide content does not exceed a particular value. The small amount of 0.1 to 0.5 weight percent of magnesium oxide is sufficient for preventing the unrestrained growth of grains. The zirconium oxide, which is added to the aluminum oxide, is present in the starting material in its monoclinic form. On the other hand, the small amounts of 0.1 to 0.5 weight percent of MgO are not sufficient to stabilize the $ZrO_2$ during sintering in its cubic modification.

In the sintering process, the unstabilized zirconium oxide is converted into the tetragonal phase. Being reversible, this phase is converted back to the monoclinic form on cooling. It is probably of considerable importance that the conversion to the monoclinic phase is restrained by the relatively small particle size of less than 1 μm which, preferably, is even less than 0.5 μm. As a consequence, latent tensions are incorporated in the crystal structure which are suitable for absorbing a large portion of the forces which occur in the metal-removing processing.

It is important that the cutting tip have a porosity of less than 2%, preferably of less than 1%. This increases the cutting performance and especially the edge strength of the inventive cutting tip. By appropriate procedures, it can be ensured that these pores are as small as possible, preferably having a median value of less than 2 μm.

Moreover, very important effects result from the fracture toughness $K_{Ic}$ being at least 190 N/mm$^{3/2}$ at room temperature and especially that at 1000° C., that is, at temperatures which are frequently encountered in machining operations at high cutting speeds, the fracture toughness still is at least 140 N/mm$^{2/2}$. Preferably, the fracture toughness is even greater than 200 N/mm$^{3/2}$ at room temperature and at least 150 N/mm$^{3/2}$ at 1000° C.

The required small porosity of the inventive cutting tip goes hand in hand with a high density of the material. This density should be at least 98% of the theoretical value. In the preferred case with a zirconium oxide of 13 to 17 weight percent, the density of a cutting tip, sintered in the usual manner, is preferably at least 4.1.

The high $K_{Ic}$ value ensures that particles do not break off from the crystalline system during the machining process or as a result of the high edge stresses which occur during the machining process. Consequently, the service life of the tool is increased and materials can be machined at high speeds, which preferably could not be economically used with conventional cutting ceramics.

It was altogether surprising that a longer tool life can be achieved with relatively high proportions of zirconium oxide, which would have been expected to reduce the temperature resistance, if all of the above property requirements are combined in the manner specified. By so doing, a grain structure is attained which has an optimum combination of properties relative to the previously known cutting tips.

At the same time, the dense and tight grain system is of particular importance. With this property, even if the tool is overstressed, the breaking off of complete corners from the cutting tip which would make it unusable can be avoided.

The process for the preparation of the inventive cutting tip is important in order to achieve this special combination of properties, which was previously considered impossible to attain and which is responsible for the significantly higher specific stress-carrying ability of the cutting edges.

A preferred process comprises intimately mixing:
70 to 90 weight percent of aluminum oxide with an Al$_2$O$_3$ of at least 99% and an average particle size of a median value of less than 1.0 μm;
10 to 30 weight percent of zirconium oxide with a ZrO$_2$ content of at least 99% and an average particle size of a median value of less than 1.0 μm; and
0.1 to 0.5 weight percent of a pure magnesium oxide, the oxide impurities of this starting mixture of powders amounting to less than 0.6 weight percent.

If desired, molding auxiliaries may be added and cutting tips of the desired geometric shape are molded from the mixture and sintered at temperatures of 1500° to 1600° C. for a period of at least 3 hours. Preferably, the molded article is sintered at a sintering temperature between 1520° C. and 1560° C. for a period of 6 to 10 hours.

The general relationship between the sintering time and sintering temperature is that longer sintering times are selected at lower sintering temperatures and shorter sintering times are used at higher sintering temperatures. Below a sintering temperature of 1500° C., however, the molded article generally no longer has the necessary high density and low porosity. Above 1600° C., on the other hand, the growth of the grain increases markedly, the average grain size in the finished sintered product increases to more than 1.7 μm, the crystalline structure becomes less homogeneous and consequently, the properties of the cutting tip deteriorate appreciably, especially at the high cutting speeds aimed for.

The necessity for using very pure starting materials has already been stated. Particularly, advantageous results, especially in regard to the service life of the cutting tip, are obtained when the purity of the aluminum oxide used as well as that of the zirconium oxide is even higher and the alumina content and the ZrO$_2$ content exceed even the value of 99.9%. It should be pointed out that the ZrO$_2$ content includes any hafnium oxide which may be present. It is well known that the properties of these two elements and of their compounds are so similar that they occur together in nature and can be separated from one another only with difficulty. The hafnium oxide content, which may be as high as 2%, is therefore usually not removed. References to 99 weight percent and 99.9 weight percent of ZrO$_2$ therefore relate to ZrO$_2$+HfO$_2$.

At the same time, it is essential that the other oxide impurities, such as, SiO$_2$, calcium oxide and the like constitute less than 0.6 weight percent of the starting powder mixture and are, preferably, even an order of magnitude below this value. In this respect, the object of the present application differs from previously known cutting tips based on aluminum oxide and zirconium oxide. In order to ensure this low value of other oxide impurities, the magnesium oxide, which is added as a grain growth inhibitor, must, of course, also be very pure. Advantageously, an aluminum oxide powder is used to which the required amount of pure magnesium oxide has already been added during the manufacture.

The initial size of the pulverulent starting materials also has a very significant effect. In order to arrive at the very fine and uniform grain structure, the median value of the aluminum oxide and of the zirconium oxide should lie below 1.0 μm and, in the case of the zirconium oxide, preferably even below 0.5 μm. The medium value is defined as follows. The particle size distribution is represented in the usual manner by a cumulative distribution by plotting the size parameter against the percentage frequency up to 100%. Corresponding frequency distribution curves are characterized simply by stating the median value. The median value is defined as the intersection of the cumulative curve with the 50% line of the frequency function and therefore denotes the average size (particle size or pore size), 50% of the particles or pores being larger and 50% being smaller than this medium value.

The starting powder mixture is advisably molded at a pressure of at least 6000 N/cm² and preferably at one of 12,000 to 16,000 N/cm². There is a certain regularity here also, in that higher sintering temperatures are selected at lower pressures and lower sintering temperatures at higher pressures.

Widely differing materials are suitable as molding auxiliaries. Particularly good results have been achieved with polyvinyl alcohols which are advantageously used in an amount of weight percent. The molding moisture of the starting powder is about 4% by weight.

The quality of the cutting tip, particularly its high density and low porosity, is also affected to a considerable degree by the heating and cooling rates, that is, the time during which the molded green tip is heated to the stated sintering temperature and the time during which it is cooled once again to room temperature. Preferably, these heating and cooling rates are about 200° C./hour.

It is best if the inventive cutting tips are sintered in an oxidizing atmosphere. This represents a significant advantage over previously known cutting tips which contain carbide or nitride additives and therefore can be sintered only in a reducing or an inert atmosphere or in a vacuum. This, of course, requires a much greater expenditure for equipment and makes these cutting tips very expensive. Obviously, the inventive cutting tips can also be sintered by different procedures, for example, by the hot pressing process. In this case, the sintering times are significantly shorter and the temperatures in the section higher by about 100° C.

As has already been stated several times, the high $K_{Ic}$ value and especially, the value at 1000° C. which is the temperature occurring at high cutting speeds, is a very significant characteristic of the inventive cutting tips. The drawing shows a comparison of the $K_{Ic}$ values of a $ZrO_2$ and TiC-containing $Al_2O_3$ sintered ceramic, similar to that described in German Offenlegungsschrift 27 41 295 (curve 1) with those of the inventive product (curve 2). It can be seen clearly that the $K_{Ic}$ values are largely the same at room temperature and that the $K_{Ic}$ value of the prior art material decreases much more rapidly with increasing temperature than that of the invention.

The determination of the $K_{Ic}$ value (critical stress intensity factor) which is a measure of fracture toughness is described in the following.

Sample Dimensions:

Prismatic rods, with a width B of 2.5 mm, a height W of 3.5 mm and a length L of 12 mm, are cut to size from the cutting tip. Subsequently, a crack-like saw cut with a width d=120 μm, and a depth a=0.8±0.1 mm is made over the width B at L/2 with a diamond-studded copper disc. The notch radius is between 50 and 60 μm.

Procedure:

The notched sample is stressed until it fractures in a three-point bending test. For this purpose, it is placed on edge on supports at a distance S=11 mm apart and is acted upon by the test load on the side opposite to the saw cut. The load deflection rate at the site of highest bending moment is 0.25 mm/min.

The fracture resistance $K_{Ic}$ is determined from the equation $$K_{Ic} = \sigma_{bB} \cdot \sqrt{a \cdot y}$$

in which $$\sigma_{bB} = (3SF_B/2BW^2)$$

$\sigma$ is the bending strength relative to the cross-section (W.B) y a tabulated constant, which depends only on the a/W ratio, and $F_B$ is the breaking load.

The dimensions of the samples and the procedure are based on the ASTM Method E 399-72 of the Standard Test Methods for determining the tensile strength of metallic materials. With respect to the adjustment to the presupposed level state of extension and to the formation of plastic zones, ceramic materials behave uncritically. The simulation of sharp cracks by fine saw cuts represents a normal simplification for measuring the $K_{Ic}$ value of ceramic materials (see T. R. Wishaw et al, Eng. Fract. Mech. 1, 1968, 191, R.F. Pabst, dissertation, Stuttgart 1972, R. L. Bertolotti, 2. Amer. Ceram. Soc. 56, 1973, 107).

The preparation of a cutting tip in accordance with the present invention is described in the following example.

Alumina (42 kg), containing 0.2 weight percent of magnesium oxide, is dispersed with 7.5 kg of unstabilized zirconium oxide in distilled water and ground in a vibrating ball mill for 30 minutes in order to achieve homogeneous mixing. After the grinding, 1% of polyvinyl alcohol is added and the suspension is stirred intensively for 10 minutes at 500 rpm and sieved through a 40 μm sieve. The sieved suspension is dried in a spray drier and granulated. The granulated and resultingly flowable powder is molded in powder presses with a pressure of 12,000 N/cm² into cutting tips of the desired geometric shape with a green density of 2.52 g/cm². After this molding process, the molded articles are sintered at 1550° C. for a period of 8 hours. The heating and cooling rates were 200° C./hr. After the sintering, the cutting tips are ground by machining with diamond grinding wheels to their final cutting-tip geometry, in accordance with the Standard Regulations SNG, and mounted.

A cutting tip, prepared according to this example, has the following properties:

a density of 4.17 g/cm³;
a porosity of 0.5%;
an average grain size with a median value of 1.45 μm;
a Vickers hardness of 19700 N/mm²;
a bending strength of 580 N/mm²;
a fracture toughness of 201 N/mm³/² at room temperature; and
a fraction toughness of 150 N/mm³/² at 1000° C.

All grain size data in this description was determined by the Syner-Graff method.

Such a cutting tip withstands a significantly higher specific load on the cutting corners. The load carrying capacity is tested by the so-called feed test, which is carried out as follows.

At a given depth of cut (in this case 3 mm) and at a particular setting angle (in this case 85°) and for a specific cutting tip geometry (in this case Type SNGN 120816 T -0.2×20°), the feed rate is increased until the cutting tip is just able to survive without breaking a cutting time of 10 minutes at a cutting speed of 500 m/min.

Under the aforementioned test conditions, a feed rate of 0.70 mm/revolution was obtained for the cutting tip of the example.

A feed rate, which is so much higher than that of previously known cutting tips whose construction is based on Al$_2$O$_3$ alone or on ZrO$_2$ and TiC-containing cutting ceramics in accordance with German Offenlegungsschrift No. 27 41 295, in practical terms means a significant increase in the number of parts which can be machined with one cutting tip. For instance, using a rear-axle made from 41 Cr4V90 as an example, the number of parts which can be machined with one cutting tip is increased sixfold over the number of parts which can be machined with one cutting tip of alumina or of Al$_2$O$_3$-ZrO$_3$-ZrO$_2$-TiC ceramic, fabricated in accordance with German Offenlegungsschrift No. 2741295.

What is claimed is:

1. A cutting tip for shaping and metal removal during the manufacture of metal parts comprising the following composition:
   70–90 weight percent of aluminum oxide;
   10–30 weight percent of zirconium oxide;
   0.1–0.5 weight percent of magnesium oxide;
   wherein the amount of other oxide impurities is less than 0.6 weight percent and the proportions of components add up to 100,
   said composition being sintered at high temperatures and having
   a porosity of less than 2%;
   an average particle size of less than 1.7 μm; and
   a fracture toughness K$_{Ic}$ at room temperature of at least 190 N/mm$^{3/2}$ and of at least 140 N/mm$^{3/2}$ at 1000° C., measured on prismatic rods 2.5 mm wide, 3.5 mm high and 12 mm long, cut from the cutting tips and provided with a saw cut 120 μm wide, 0.8±0.1 mm deep and having a notch radius of between 50 and 60 μm.

2. The cutting tip of claim 1 wherein the average particle size is between 1.4 and 1.6 μm and 90% of all particles lie within this size range.

3. The cutting tip of claim 1 or 2 wherein the fracture toughness K$_{Ic}$ is at least 200 N/mm$^{3/2}$ at room temperature and at least 150 N/mm$^{3/2}$ at 1000° C.

4. The cutting tip of claim 1 or 2 wherein the zirconium oxide content is from about 13 to 17 weight percent and the density is at least 4.1 g/cm$^3$.

5. The cutting tip of claim 1 or 2 wherein the porosity is less than about 1%.

6. The cutting tip of claims 1 or 2 wherein the median pore size is less than 2 μm.

7. A process for the production of a cutting tip comprising intimately mixing:
   70–90 weight percent of aluminum oxide with an Al$_2$O$_3$ content of at least 99% and an average particle size of a median value of less than 1.0 μm;
   10–30 weight percent of zirconium oxide with a ZrO$_2$ content of at least 99% and an average particle size of a median value of less than 1.0 μm; and
   0.1–0.5 weight percent of pure magnesium oxide,
   the oxide impurities of this starting powder mixture amounting to less than 0.6 weight percent;
   molding cutting tips of the desired geometrical shape from the mixture and sintering the molded mixture at a temperature of 1500° to 1600° C. for a period of at least 3 hours and then cooling the sintered product.

8. The process of claim 7 wherein the molded mixture is sintered at a temperature from 1520° to 1560° C. for a period of from 6 to 10 hours.

9. The process of claim 7 or 8 wherein the rate of heating to the sintering temperature and the rate of cooling to room temperature after sintering is about 200° C. per hour.

10. The process of claim 7 or 8 wherein the sintering is carried out in an oxidizing atmosphere.

11. The process of claim 7 or 8 wherein the median value of the particle size of the zirconium oxide is less than about 0.5 μm.

12. The process of claims 7 or 8 wherein the mixture is molded at a pressure of at least 6000 N/cm$^2$.

13. The process of claim 7 or 8 wherein the mixture is molded at a pressure of at least 12,000 to 16,000 N/cm$^2$.

14. The process of claims 7 or 8 wherein a molding auxiliary is mixed into the mixture prior to molding.

15. The process of claim 14 wherein the molding auxiliary is a polyvinyl alcohol.

16. In a method for manufacturing an article from a metal selected from the group consisting of case-hardened steel, quenched steel and tempered steel, wherein the steel is processed with a cutting tip, at cutting speeds greater than 500 m/min, the improvement which comprises said cutting tip being composed of the following composition
   70–90 weight percent of aluminum oxide,
   10–30 weight percent of zirconium oxide,
   0.1–0.5 weight percent of magnesium oxide,
   wherein the amount of other oxide impurities is less than 0.6 weight percent and the proportions of components add up to 100,
   said composition being sintered at high temperatures and having
   a porosity of less than 2%,
   an average particle size of less than 1.7 μm, and a fracture toughness K$_{Ic}$ at room temperature of at least 190 N/mm$^{3/2}$ and of least 140 N/mm$^{3/2}$ at 1000° C., measured on prismatic rods 2.5 mm wide, 3.5 mm high and 12 mm long, cut from the cutting tips and provided with a saw cut 120 μm wide, 0.8±0.1 mm deep and having a notch radius of between 50 and 60 μm.

17. A composition comprising
   70 to 90 weight percent of aluminum oxide;
   10 to 30 weight percent of zirconium oxide;
   0.1 to 0.5 weight percent of magnesium oxide;
   wherein the amount of other oxide impurities is less than 0.6 weight percent and the proportions of components add up to 100,
   said composition being sintered at high temperatures and having
   a porosity of less than 2%,
   an average particle size of less than 1.7 μm, and a fracture toughness K$_{Ic}$ at room temperature of at least 190 N/mm$^{3/2}$ and of at least 140 N/mm$^{3/2}$ at 1000° C., measured on prismatic rods of said sintered composition 2.5 mm wide, 3.5 mm high and 12 mm long and provided with a saw cut 120 μm wide, 0.8±0.1 mm deep and having a notch radius of between 50 and 60 μm.

\* \* \* \* \*